United States Patent
Yi et al.

(10) Patent No.: US 10,066,535 B2
(45) Date of Patent: Sep. 4, 2018

(54) COMPACT DESIGN EXHAUST AFTERTREATMENT SYSTEM WITH NOX SENSOR

(71) Applicant: Caterpillar Inc., Peoria, IL (US)

(72) Inventors: Yong Yi, Dunlap, IL (US); Bogdan Balea, Peoria, IL (US); Eric Paul Spaeth, Pekin, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/353,960

(22) Filed: Nov. 17, 2016

(65) Prior Publication Data

US 2018/0135496 A1 May 17, 2018

(51) Int. Cl.
| | | |
|---|---|---|
| *F01N 3/00* | (2006.01) | |
| *F01N 11/00* | (2006.01) | |
| *F01N 13/00* | (2010.01) | |
| *F01N 3/20* | (2006.01) | |
| *F01N 3/021* | (2006.01) | |

(52) U.S. Cl.
CPC ............ *F01N 11/007* (2013.01); *F01N 3/021* (2013.01); *F01N 3/2066* (2013.01); *F01N 13/008* (2013.01); *F01N 2560/026* (2013.01)

(58) Field of Classification Search
USPC .............. 60/274, 276, 295, 297, 301, 311; 73/23.31, 114.71, 866.5
See application file for complete search history.

(56) References Cited

U.S. PATENT DOCUMENTS

| | | | |
|---|---|---|---|
| 6,601,444 B2 | 8/2003 | Ohmori et al. | |
| 6,843,104 B2 | 1/2005 | Busch | |
| 6,912,889 B2* | 7/2005 | Staphanos | G05B 23/0208 73/23.2 |
| 7,497,138 B2* | 3/2009 | Kubinski | F01N 13/008 73/114.71 |
| 8,061,130 B2 | 11/2011 | Shibasaki | |
| 8,341,936 B2* | 1/2013 | Zhang | F01N 11/00 60/274 |
| 8,756,913 B2* | 6/2014 | Liu | F01N 3/2066 422/82.01 |
| 9,140,173 B2 | 9/2015 | Nakamura et al. | |
| 9,482,154 B2* | 11/2016 | Van Niekerk | F01D 25/30 |
| 2004/0149595 A1 | 8/2004 | Moore | |
| 2012/0110982 A1 | 5/2012 | McMackin et al. | |
| 2013/0213013 A1* | 8/2013 | Mitchell | F01N 11/00 60/276 |
| 2015/0160102 A1* | 6/2015 | Denis | F01N 3/2066 60/301 |

FOREIGN PATENT DOCUMENTS

| | | |
|---|---|---|
| DE | 102010046851 | 3/2012 |
| JP | 3947079 | 7/2007 |

* cited by examiner

*Primary Examiner* — Binh Q Tran

(74) *Attorney, Agent, or Firm* — Kelly J. Smith

(57) ABSTRACT

An exhaust aftertreatment system includes a housing including at least one exhaust aftertreatment component. The housing defines a body portion and an outlet portion terminating in an outlet opening. The outlet portion decreases in diameter from the body portion toward the outlet opening. A sampling tube is positioned within the outlet portion and extends between opposing sides of an inner wall of the outlet portion, with the sampling tube having a plurality of openings facing the body portion. A NOx sensor is positioned in fluid communication with an interior of the sampling tube.

19 Claims, 3 Drawing Sheets

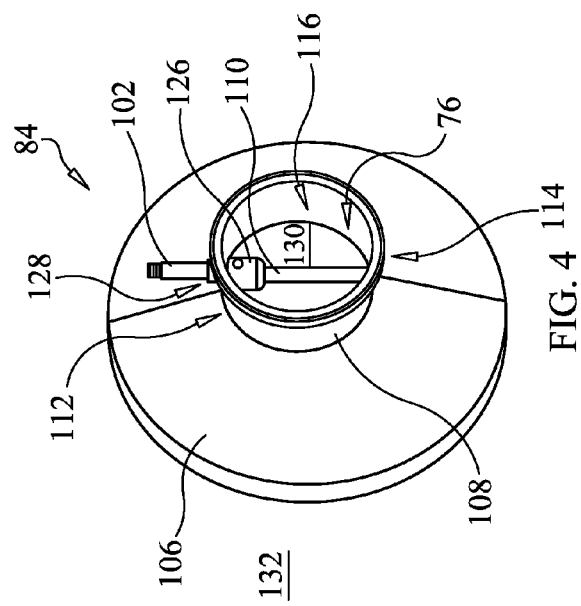
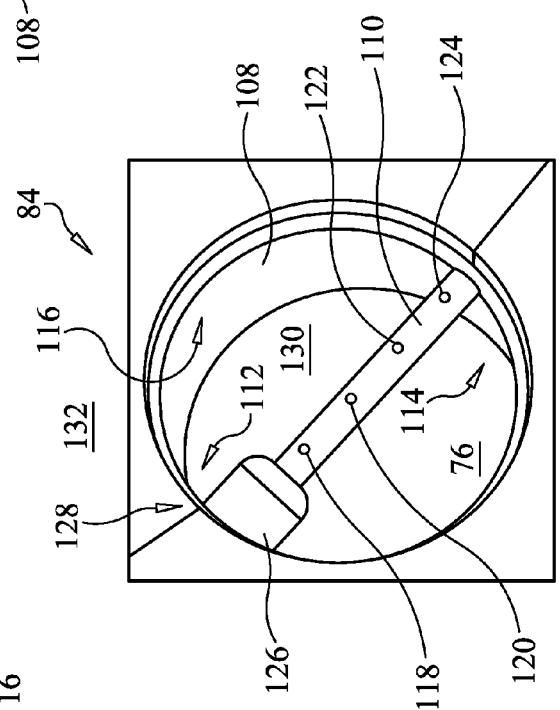
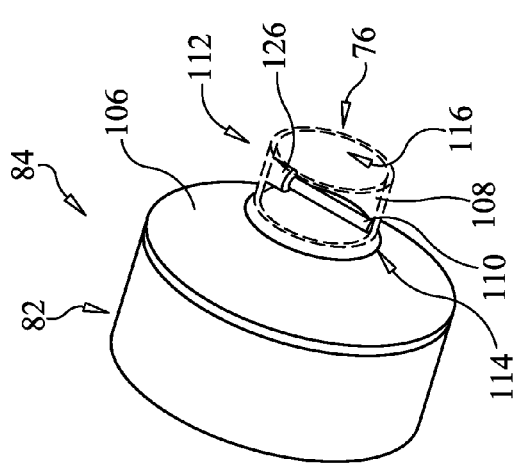

COMPACT DESIGN EXHAUST AFTERTREATMENT SYSTEM WITH NOX SENSOR

TECHNICAL FIELD

The present disclosure relates generally to a compact design of an exhaust aftertreatment system, and more particularly to a NOx sensor positioned in fluid communication with a sampling tube positioned downstream of a cone-shaped portion of an outlet portion of the exhaust aftertreatment system.

BACKGROUND

Toxic emissions produced by internal combustion engines are the subject of environmental concern and have prompted increasingly stringent emissions regulations by the government. Toxic emissions produced by diesel engines, for example, include hydrocarbons, nitrogen oxides, carbon monoxide, and particulate matter. Although most of these exhaust emissions have been reduced in many modern engines, NOx and particulate matter remain at relatively high levels. To reduce these toxic emissions and comply with governmental regulations, a number of exhaust aftertreatment components, including particulate filters and catalytic converters, have been developed. According to specific examples, an engine system may include a diesel particular filter, a diesel oxidation catalyst, and a selective catalytic reduction component for treating the engine exhaust.

U.S. Patent Application Publication No. 2013/0213013 to Mitchell et al. discloses a sensor module for sensing characteristics of a fluid flowing through a fluid conduit. The sensor module includes a sample probe with at least one sample arm that extends radially inwardly from a sidewall portion of the fluid conduit to a center portion of the fluid conduit, defines a fluid flow channel and includes a plurality of inlet apertures. The sample probe also includes a fluid well, with a sensor positioned in an interior volume of the fluid well.

As should be appreciated, there is a continuing need to reduce exhaust emissions using effective and efficient means. The present disclosure is directed to such an endeavor.

SUMMARY OF THE INVENTION

In one aspect, an exhaust aftertreatment system includes a housing including at least one exhaust aftertreatment component. The housing defines a body portion and an outlet portion terminating in an outlet opening. The outlet portion decreases in diameter from the body portion toward the outlet opening. A sampling tube is positioned within the outlet portion and extends between opposing sides of an inner wall of the outlet portion, with the sampling tube having a plurality of openings facing the body portion. A NOx sensor is positioned in fluid communication with an interior of the sampling tube.

In another aspect, an internal combustion engine includes an exhaust conduit extending from the internal combustion engine to an inlet of an exhaust aftertreatment system. The exhaust aftertreatment system includes a housing including at least one exhaust aftertreatment component, the housing defining a body portion and an outlet portion terminating in an outlet opening. A sampling tube is positioned within the outlet portion and extends between opposing sides of an inner wall of the outlet portion, with the sampling tube having a plurality of openings facing the body portion. A NOx sensor is in fluid communication with an interior of the sampling tube, wherein the NOx sensor is positioned within six inches from an outlet of the at least one exhaust aftertreatment component.

In yet another aspect, a method of treating exhaust from an internal combustion engine using an exhaust aftertreatment system is provided. The method includes a step of directing an exhaust flow from the internal combustion engine through at least one exhaust aftertreatment component positioned within a housing. The housing defines a body portion and an outlet portion terminating in an outlet opening. The method also includes steps of increasing mixing of the exhaust flow by directing the exhaust flow through the outlet portion having a diameter that decreases from the body portion toward the outlet opening, sampling portions of the exhaust flow through a plurality of openings of a sampling tube positioned within the outlet portion and extending between opposing sides of an inner wall of the outlet portion, and measuring a NOx level of the exhaust flow using a NOx sensor in fluid communication with an interior of the sampling tube.

BRIEF DESCRIPTION OF THE DRAWINGS

FIG. 3 is a side perspective view of an exemplary outlet of the exhaust aftertreatment of FIG. 2, including a cone-shaped outlet;

FIG. 4 is a rear perspective view of the cone-shaped outlet of FIG. 3; and

FIG. 5 is a front perspective view of an exemplary sampling tube supported within the exemplary outlet of the previous FIGS.

DETAILED DESCRIPTION

Figure 1:
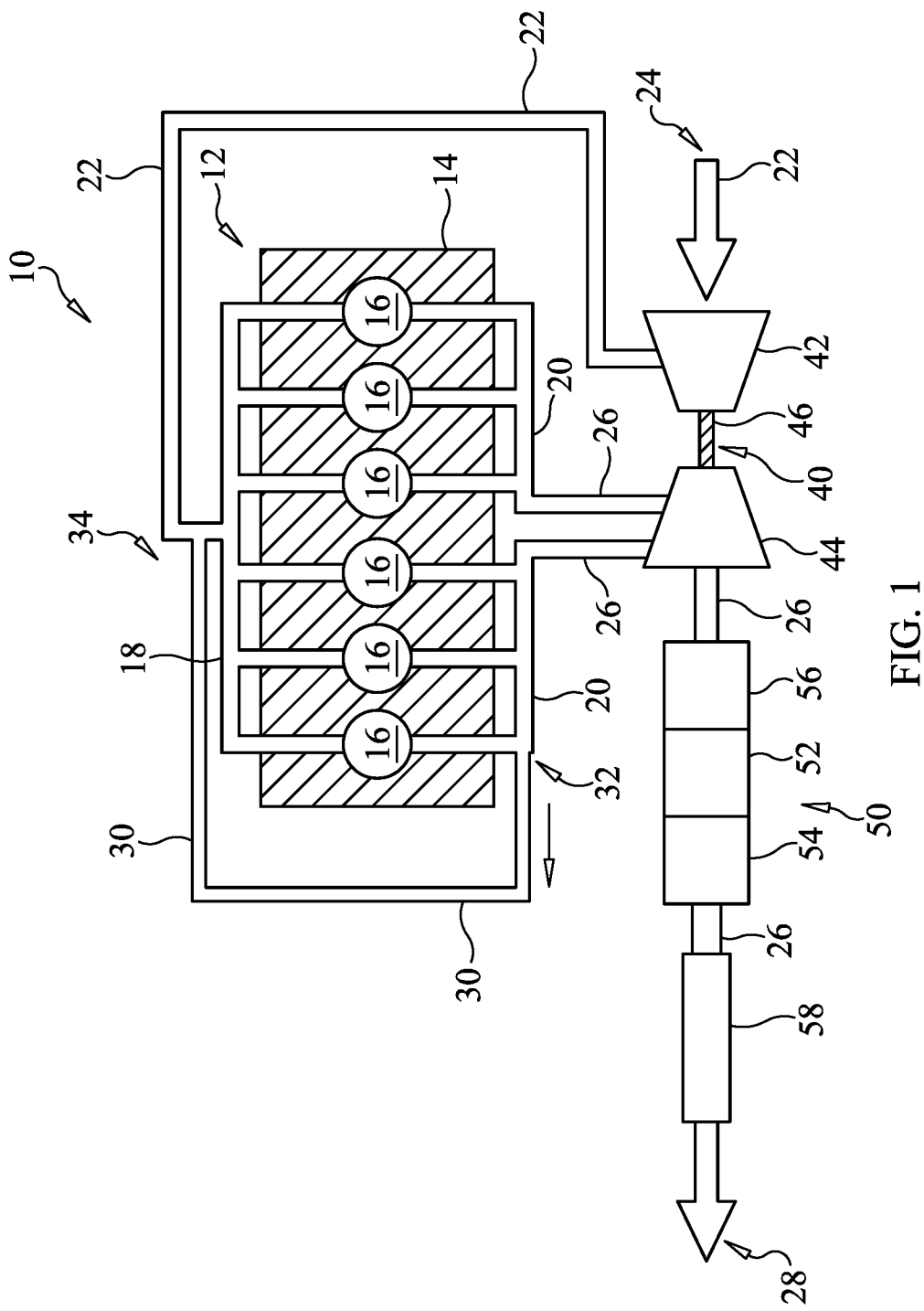
FIG. 1 is a schematic diagram of an exemplary engine system including a plurality of exhaust aftertreatment components, according to the present disclosure.

Referring to FIG. 1, there is shown a schematic view of an engine system 10, according to the present disclosure. The engine system 10 includes an internal combustion engine 12, which for purposes of illustration, and not limitation, is that of a four-stroke, compression ignition engine and includes an engine block 14 defining a plurality of combustion chambers or cylinders 16. The internal combustion engine 12 may be any type of engine (e.g., internal combustion, gas, diesel, gaseous fuel, natural gas, propane, etc.), may be of any size, with any number of cylinders, any type of combustion chamber (e.g., cylindrical, rotary spark ignition, compression ignition, 4-stroke and 2-stroke, etc.), and in any configuration (e.g., "V," in-line, radial, etc.). The internal combustion engine 12 may also be used in a variety of applications, including, for example, land and marine applications. In the exemplary internal combustion engine 12, six combustion chambers 16 are shown; however, those skilled in the art will appreciate that any number of combustion chambers 16 may be applicable.

The internal combustion engine 12 may also include an intake manifold 18 in communication with the combustion chambers 16 and capable of providing air to the internal combustion engine 12, and an exhaust manifold 20 also in communication with combustion chambers 16 and capable of expending exhaust gas from the engine block 14. Generally speaking, the engine system 10 includes an intake air conduit 22, or passageway, extending from an air inlet 24 to the intake manifold 18, and an exhaust conduit 26, or passageway, extending from the exhaust manifold 20, to an exhaust outlet 28. According to some embodiments, an exhaust gas recirculation (EGR) conduit 30, or passageway, may have an inlet 32 in fluid communication with the exhaust conduit 26 and an outlet 34 in fluid communication with the intake air conduit 22, and may provide a path for a portion of the exhaust expended through the exhaust conduit 26 to be rerouted to the intake manifold 18 via the intake air conduit 22.

The engine system 10 may also include a turbocharger of standard design, shown generally at 40. The turbocharger 40 may include a compressor 42, disposed along the intake air conduit 22, connected to a turbine 44, disposed along the exhaust conduit 26, via a shaft 46. Exhaust gas leaving the exhaust manifold 20 passes through the exhaust conduit 26 and to a wheel of the turbine 44 to make it rotate. The rotation of the wheel turns the shaft 46, which, in turn, rotates a wheel of the compressor 42. The rotation of the compressor wheel pulls in ambient air through the intake air conduit 22 and compresses it.

The engine system 10 also includes an exhaust aftertreatment system 50 disposed along the exhaust conduit 26. Most machines utilizing compression ignition engines employ one or more exhaust aftertreatment systems to reduce NOx and PM emissions. For example, most diesel engines use diesel particulate filters to reduce emissions of PM, or soot. Further, many diesel engines use selective catalytic reduction (SCR) to convert NOx, a smog causing pollutant and greenhouse gas, in the exhaust stream into harmless components, such as nitrogen and water vapor. Such aftertreatment systems, when working properly, serve to reduce NOx and PM emissions to relatively low levels.

Figure 2:
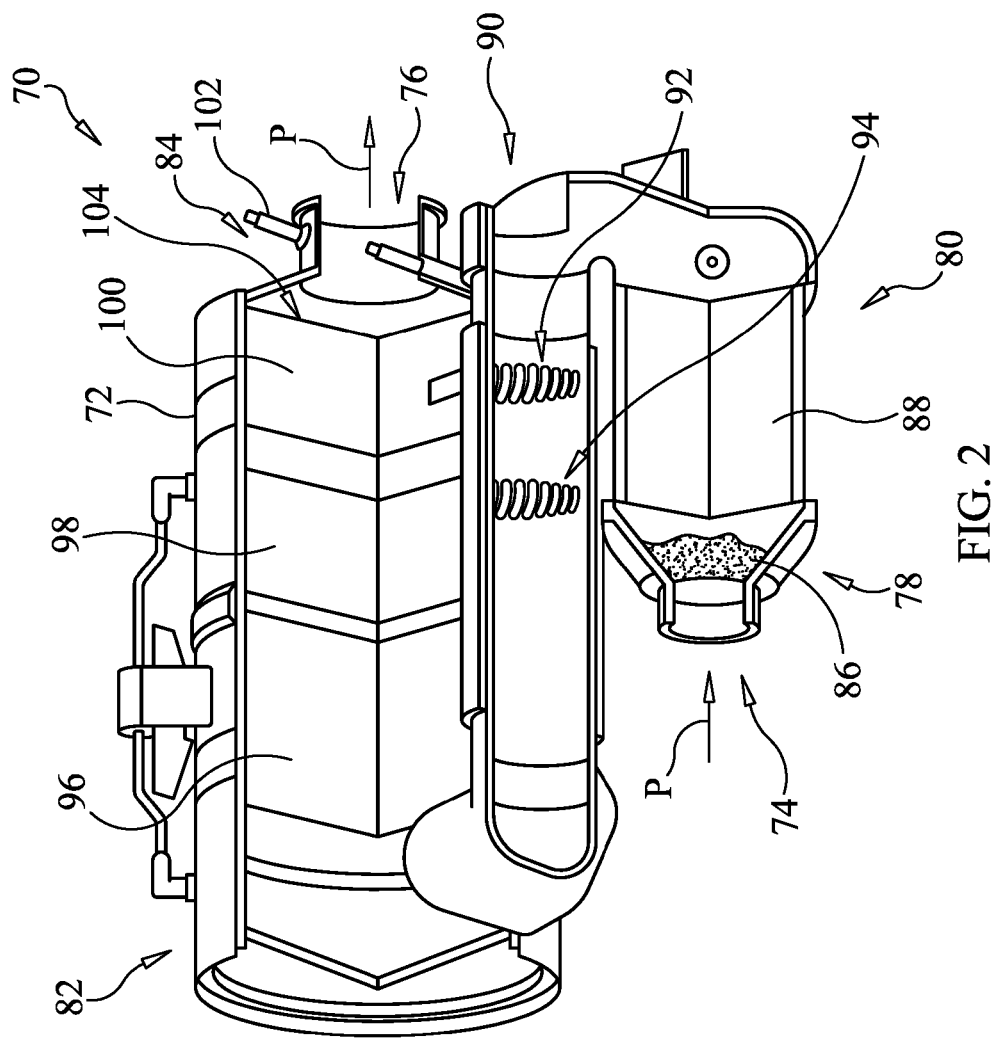
FIG. 2 is an exemplary embodiment of an exhaust aftertreatment system including one or more of the exhaust aftertreatment components of FIG. 1, according to various aspects of the present disclosure.

According to the exemplary embodiment, the engine system 10 may include a plurality of exhaust aftertreatment components, which may be packaged together or separately, to define the exhaust aftertreatment system 50, such as one shown in FIG. 2. For example, the exhaust aftertreatment system 50 may include a catalyst-based device 52, which may also be referred to as an exhaust aftertreatment component. The catalyst-based device 52 may include a catalyst configured to convert, such as via oxidation or reduction, one or more gaseous constituents of the exhaust gas produced by the internal combustion engine 12 to a more environmentally friendly gas and/or compound to be discharged into the atmosphere. For example, the catalyst may be configured to chemically alter at least one component of the exhaust flow. Catalyst-based device 52 may be configured for one or more various types of conversion, such as, for example, selective catalytic reduction (SCR), diesel oxidation (e.g., a diesel oxidation catalyst, DOC), and/or adsorption of nitrous oxides (NOx; e.g., a NOx adsorber.).

The exhaust aftertreatment system 50 may also include a particulate trap, such as, for example, a diesel particulate filter (DPF) 54, which may also be referenced as an exhaust aftertreatment component. The DPF 54 may include any type of aftertreatment device configured to remove one or more types of particulate matter, such as soot and/or ash, from an exhaust flow of the internal combustion engine 12. The DPF 54 may include a filter medium configured to trap the particulate matter as the exhaust gas flow through it. The filter medium may consist of a mesh-like material, a porous ceramic material (e.g., cordierite), or any other material and/or configuration suitable for trapping particulate matter.

Regenerating means, such as well-known active and/or passive regeneration means, may also be provided to periodically or continuously oxidize trapped particulate matter in the DPF 54. A regeneration system, which may also be generally referred to as an aftertreatment component, is shown generally at 56.

It should be appreciated that the engine system 10 may include any number and/or combination of exhaust aftertreatment components for treating or otherwise affecting the exhaust, and, further, any one or more exhaust aftertreatment components may be packaged together within a common module. Although the exemplary exhaust aftertreatment components (e.g., 52, 54 and 56) are shown positioned downstream from the turbine 44 of the turbocharger 40, it should be appreciated that one or more aftertreatment components may be positioned upstream from the turbine 44, and/or one or more aftertreatment components may be positioned along the exhaust gas recirculation conduit 30. A tailpipe 58 may be positioned downstream of the exhaust aftertreatment system 50 to expel the exhaust. The exemplary embodiment of FIG. 1 is provided mainly for context of an engine system and an exhaust aftertreatment system 50.

Turning now to FIG. 2, an exemplary compact design for an exhaust aftertreatment system is shown generally at 70. The exhaust aftertreatment system 70 may include many of the components described above, and generally includes a housing 72 defining an exhaust flow path P from an exhaust inlet opening 74 to an exhaust outlet opening 76. According to the exemplary embodiment, the housing 72, which may include a plurality of housings joined together, may include an inlet portion 78, an upstream body portion 80, a body portion 82, and an outlet portion 84. The inlet portion 78 may be configured to fluidly connect with an upstream exhaust aftertreatment component, conduit, or other device positioned along the exhaust conduit 26, as shown in FIG. 1. The outlet portion 84 may be configured to fluidly connect with a downstream exhaust aftertreatment component, such as, for example, the tailpipe 58, or other devices positioned along the exhaust conduit 26.

The housing 72 includes, or contains, at least one exhaust aftertreatment component. The exhaust aftertreatment system 70, according to the exemplary embodiment, may include a diesel oxidation catalyst (DOC) inlet diffuser 86 and a DOC 88. Diesel exhaust fluid (DEF) is an emissions control liquid, which may be required by some diesel engines. It is injected via an injector 90 into the exhaust stream. DEF may be used by Selective Catalytic Reduction (SCR) technology to remove harmful NOx emissions from diesel engines. One or more mixers 92 and 94 may be provided downstream of the DEF injector 90. A DPF 96 and one or more selective catalytic reduction components, two SCRs 98 and 100, may be provided or housed in the body portion 82 of the housing 72. It should be appreciated that those skilled in the art are familiar with the particular components generally used as exhaust aftertreatment components.

A NOx sensor 102, according to the present disclosure, is positioned in the outlet portion 84 of the housing 72. According to some embodiments, the NOx sensor 102 may be positioned within six inches from an outlet 104 of one of the exhaust aftertreatment components, such as the selective catalytic reduction component 100. Further, the NOx sensor 102 may be positioned within two inches from the outlet 104 of the selective catalytic reduction component 100. The placement of the NOx sensor 102 may be dictated by a compact design of the aftertreatment system and may include placement in close proximity of the outlet 104 of the SCR component 100 and upstream relative to the tailpipe.

Referring also to FIGS. 3 and 4, the outlet portion 84 will be discussed in greater detail. The outlet portion 84 may terminate in the outlet opening 76, as shown. The outlet portion 84 may decrease in diameter from the body portion 82 toward the outlet opening 76. That is, the outlet portion 84 may include a conical portion 106 and a flange or hollow cylindrical portion 108. The flange portion 108 may include or fluidly communicate with a conduit or tailpipe, such as the tailpipe 58.

Referring also to FIG. 5, a sampling tube 110 may be positioned within the outlet portion 84 and may extend between opposing sides 112 and 114 of an inner wall 116 of the outlet portion 84. The sampling tube 110 may have a plurality of openings 118, 120, 122 and 124 facing the body portion 82, or facing and receiving the exhaust flow path P. The sampling tube 110 includes at least three openings 118, 120, 122 and 124 spaced apart along a length of the sampling tube 110, such as along a straight line.

A sensor receptacle 126 is received within an opening 128 through the outlet portion 84 and fluidly connects an interior 130 of the sampling tube 110 with an exterior 132 of the housing 72, wherein the NOx sensor 102 is received within the sensor receptacle 126 and is in fluid communication with the interior 130 of the sampling tube 110. Wherein an opening closest to the NOx sensor 102 (i.e., opening 118) is smaller than the other of the openings (i.e., openings 120, 122 and 124). Further, according to some embodiments, an outlet 134 of the sensor receptacle 126 has a cross-sectional area about equal to combined cross-sectional areas of the at least three openings 118, 120, 122 and 124. The sampling tube 110 is oriented at an angle less than about 30 degrees from an axis perpendicular to a centerline axis X of the outlet portion 84, with the NOx sensor being positioned above a centerline axis X of the outlet portion 84.

INDUSTRIAL APPLICABILITY

The present disclosure relates generally to an exhaust aftertreatment system. More particularly, the present disclosure relates to a compact design for an exhaust aftertreatment system. Yet further, the present disclosure relates to the positioning of a NOx sensor in relatively close proximity to an outlet of the exhaust aftertreatment system, and strategies to improve accuracy of a reading from the NOx sensor.

Traditionally, an exhaust aftertreatment system NOx sensor is located downstream of an exhaust gas flow outlet of an SCR catalyst brick, such as in a tailpipe. This may be done in order to obtain good exhaust gas stream mixing before reaching the NOx sensor, thereby reducing inaccurate readings by the NOx sensor. Further, placement of the NOx sensor in the tailpipe may reduce incorrect readings cause by condensation buildup around the NOx sensor.

However, current design requirements may necessitate the placement of the NOx sensor 102 significantly closer to the exhaust gas flow of the SCR catalyst brick 100 than in the traditional configuration. More specifically, the NOx sensor may be located near the exit of the exhaust aftertreatment system 70, upstream of the tailpipe, such as tailpipe 58, and just downstream of the exhaust gas flow outlet 104 of the SCR catalyst brick 100. This may lead to incorrect NOx level measurements due to incomplete mixing of the exhaust gas stream in additional to condensation buildup.

Referring generally to FIGS. 1-5, the current disclosure is directed to an aftertreatment system 70 having a NOx sensor 102 located near its exit, or an outlet portion 84 and/or outlet opening 76. More specifically, the current disclosure is related to an aftertreatment system 70 having a conical portion 106. The conical portion 106, or outlet, increases the mixing of the exhaust gas flow over short distances than traditionally shaped outlets and directs the flow towards the NOx sensor 102.

Furthermore, the conical outlet includes an integrated chamber into which the NOx sensor is placed. The integrated chamber provides a location for the mixed exhaust gas flow to be consistently sampled. Yet further, the new aftertreatment system design includes a sampling tube extending from the chamber to an opposite wall of the conical outlet. This tube includes at least three holes spaced-apart along its length to sample the exhaust gas flow along various locations between the chamber and the opposite wall of the conical outlet, thereby obtaining a more representative sample of the exhaust gas stream. Moreover, the diameter of the hole closest to the chamber is smaller than the remaining holes in order to obtain better mixing and thus a more representative sample of the exhaust stream. Plus, the holes are sized so that the tube has a refresh rate of at least 20 refills per second, and the tube exist orifice is sized to have a cross-sectional area about equal to the combined cross-sectional area of the tube holes. Lastly, in order to reduce condensation buildup around the NOx sensor, it, the chamber and the flute are oriented at an angle of 10 degrees or greater from perpendicular with respect to a longitudinal axis running through the conical outlet.

Method of treating exhaust includes directing exhaust flow from the internal combustion engine through at least one exhaust aftertreatment component positioned within a housing. Mixing of the exhaust flow is increased by directing the exhaust flow through the outlet portion having a diameter that decreases from the body portion toward the outlet opening. Portions of the exhaust flow are sampled through a plurality of openings of a sampling tube positioned within the outlet portion and extending between opposing sides of an inner wall of the outlet portion. A NOx level of the exhaust flow is measured using a NOx sensor in fluid communication with an interior of the sampling tube.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An exhaust aftertreatment system, including:
   a housing including at least one exhaust aftertreatment component, the housing defining a body portion and an outlet portion terminating in an outlet opening,
   the outlet portion decreasing in diameter from the body portion toward the outlet opening and including a conical portion;
   a sampling tube positioned within the outlet portion downstream from the conical portion and upstream from the outlet opening and extending between opposing sides of an inner wall of the outlet portion, the sampling tube having a plurality of openings facing the body portion; and
   a NOx sensor in fluid communication with an interior of the sampling tube.

2. The exhaust aftertreatment system of claim 1, wherein the NOx sensor is positioned within six inches from an outlet of the at least one exhaust aftertreatment component.

3. The exhaust aftertreatment system of claim 1, wherein the at least one exhaust aftertreatment component is a selective catalytic reduction component.

4. The exhaust aftertreatment system of claim 3, wherein the housing also includes at least one diesel particulate filter.

5. The exhaust aftertreatment system of claim 3, wherein the NOx sensor is positioned within two inches from an outlet of the selective catalytic reduction component.

6. The exhaust aftertreatment system of claim 1, wherein the sampling tube includes at least three openings spaced apart along a length of the sampling tube.

7. The exhaust aftertreatment system of claim 6, wherein an opening closest to the NOx sensor is smaller than other openings of the at last three openings.

8. The exhaust aftertreatment system of claim 6, wherein a sensor receptacle is received within an opening through the outlet portion and fluidly connects the interior of the sampling tube with an exterior of the housing, wherein the NOx sensor is received within the sensor receptacle.

9. The exhaust aftertreatment system of claim 8, wherein an outlet opening of the sensor receptacle has a cross-sectional area about equal to combined cross sectional areas of the at least three openings.

10. The exhaust aftertreatment system of claim 1, wherein the sampling tube is oriented at an angle less than about 30 degrees from an axis perpendicular to a centerline axis of the outlet portion.

11. The exhaust aftertreatment system of claim 1, wherein the NOx sensor is positioned above a centerline axis of the outlet portion.

12. The exhaust aftertreatment system of claim 1, wherein the NOx sensor is positioned upstream relative to a tailpipe.

13. An internal combustion engine, including:
an exhaust conduit extending from the internal combustion engine to an inlet of an exhaust aftertreatment system;
the exhaust aftertreatment system including a housing including at least one exhaust aftertreatment component, the housing defining a body portion and an outlet portion terminating in an outlet opening;
wherein the outlet portion decreases in diameter from the body portion toward the outlet opening and includes a conical portion;
a sampling tube positioned within the outlet portion downstream from the conical portion and upstream from the outlet opening and extending between opposing sides of an inner wall of the outlet portion, the sampling tube having a plurality of openings facing the body portion; and
a NOx sensor in fluid communication with an interior of the sampling tube, wherein the NOx sensor is positioned within six inches from an outlet of the at least one exhaust aftertreatment component.

14. The internal combustion engine of claim 13, wherein the NOx sensor is positioned within two inches from an outlet of the selective catalytic reduction component.

15. The internal combustion engine of claim 13, wherein the sampling tube includes at least three openings spaced apart along a length of the sampling tube.

16. The internal combustion engine of claim 15, wherein an opening closest to the NOx sensor is smaller than other openings of the at least three openings.

17. A method of treating exhaust from an internal combustion engine using an exhaust aftertreatment system, the method including steps of:
directing an exhaust flow from the internal combustion engine through at least one exhaust aftertreatment component positioned within a housing, wherein the housing defines a body portion and an outlet portion terminating in an outlet opening;
increasing mixing of the exhaust flow by directing the exhaust flow through the outlet portion having a diameter that decreases from the body portion toward the outlet opening and includes a conical portion;
sampling portions of the exhaust flow through a plurality of openings of a sampling tube positioned within the outlet portion downstream from the conical portion and upstream from the outlet opening and extending between opposing sides of an inner wall of the outlet portion; and
measuring a NOx level of the exhaust flow using a NOx sensor in fluid communication with an interior of the sampling tube.

18. The method of claim 17, further including measuring the NOx level of the exhaust flow with the NOx sensor positioned within six inches from an outlet of the at least one exhaust aftertreatment component.

19. The method of claim 17, further including measuring the NOx level of the exhaust flow with the NOx sensor positioned within two inches from an outlet of a selective catalytic reduction component.

* * * * *